UNITED STATES PATENT OFFICE.

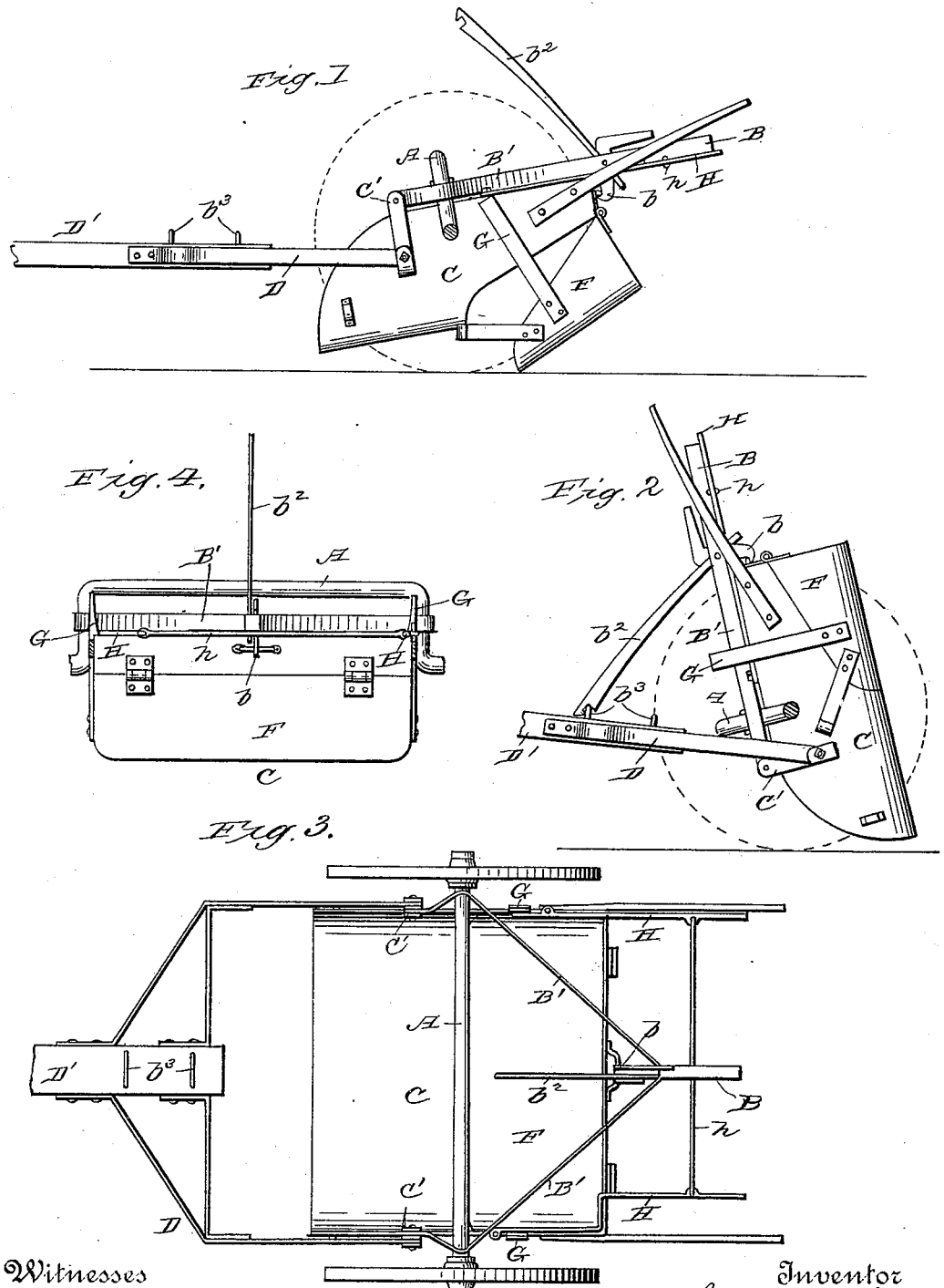

CHARLES RATH, OF MOBEETIE, TEXAS.

SCRAPER.

SPECIFICATION forming part of Letters Patent No. 420,960, dated February 11, 1890.

Application filed June 22, 1889. Serial No. 315,188. (No model.)

*To all whom it may concern:*

Be it known that I, CHARLES RATH, of Mobeetie, in the county of Wheeler and State of Texas, have invented certain new and useful Improvements in Scrapers; and I do hereby declare the following to be a full, clear, and exact description of the same, reference being had to the accompanying drawings, forming a part of this specification, and to the letters of reference marked thereon.

In that class of scrapers for conveying dirt from one place to another, particularly in the construction of roads, &c., and in which the pan or bowl is adapted to gather up the dirt and convey the same to the desired locality for dumping, difficulty has been experienced in dumping or discharging the dirt from the pan or bowl with the mechanisms usually employed to turn the same in order to accomplish the desired result, owing to the necessarily great weight of the dirt which has to be lifted to a greater or less extent by the operator.

It is the object of my present invention to in a great measure overcome or entirely obviate the difficulty mentioned, and to construct a scraper which will be practically self-dumping or require at most but the very slightest assistance on the part of the attendant to give the bowl the initial start after the catches which prevent the dumping have been released.

To the ends above mentioned the invention consists, broadly stated, in a scraper in which the bowl is divided with the rear section hinged at the back in such manner as that when allowed to drop it will dump the contained dirt, and, if desired, arrest the motion of the lower portion of the bowl and cause the same to tilt sufficiently for the engagement of the front edge with the solid ground to turn the bowl completely over in the usual manner.

The invention further consists in certain novel details of construction and combinations and arrangements of parts, as will be hereinafter described, and pointed out particularly in the claims at the end of this specification.

In the accompanying drawings, Figure 1 is a side elevation of a scraper constructed in accordance with my invention, having one of the wheels removed and the rear section lowered. Fig. 2 is a similar view with the scraper-bowl turned over into the position occupied immediately after the dumping operation. Fig. 3 is a top plan view, and Fig. 4 a rear elevation, of a similar form of scraper.

Similar letters of reference in the several figures indicate the same parts.

My present invention is particularly adapted for application to an ordinary wheel-scraper of any desired construction, although that shown in the accompanying drawings will for some purposes be found preferable.

In said drawings, A represents the cranked axle, to which is rigidly connected the handle B for elevating and lowering the bowl C, which latter is connected thereto through the medium of the forwardly-extending arms B' and standards C' C', mounted rigidly on the bowl and pivotally connected to said arms. The hounds D and tongue D' are connected preferably to the bowl at the base of the standards C' in the usual manner, as shown.

On the back of the scraper-bowl is a projection or notch with which the catch $b$ on the operating-handle is adapted to engage for locking the bowl in elevated position for transportation of the contained earth, and preferably mounted on the same pivot with said catch $b$ is an arm $b^2$, on the end of which is a catch for engaging with lugs or staple-like projections $b^3$ on the tongue for holding the bowl in reversed position when it is desired to transport the scraper from place to place. The bowl itself is, as before stated, formed in sections, the rear bottom section F being pivoted to the forward section, which extends around the rear of the bowl at the top by means of hinges or otherwise, so as to swing down at the forward edge, as shown clearly in Fig. 1, catches G being provided thereon for engaging the upper edge of the forward section to retain the rear section in closed position.

For the purpose of releasing the catches simultaneously when it is desired to dump the load, I provide arms H, pivoted to the scraper-bowl on one side in front of the catch and on the opposite side in the rear of its catch and connect said arms by a link $h$. With this construction it will be seen that when said arms are moved, as they necessarily must be, in the same direction, both catches will be released.

The operation will now be readily understood. Assuming that the bowl has been loaded in the usual manner by lowering the same, raising the handle and moving the scraper forward until a sufficient amount of dirt has been forced into the bowl, and that the same has been transported to the place for dumping, when it is desired to dump, it is only necessary for the attendant to move the arms H to one side and release the catches G, thus permitting the rear section to swing down by its own weight and the weight of the contained dirt, dumping the dirt contained therein, and if the forward movement of the scraper is continued in the construction illustrated, causing the forward edge to be depressed and the scraper-bowl to be turned entirely over in the ordinary manner incident to the use of all scrapers of this character.

It is obvious that while I have shown the present improvement as applied to a wheel-scraper of particular construction, the divided bowl may be applied to any other form of scraper in which a bowl is employed adapted to transport the dirt from one place to another, and to be emptied or dumped by the operator or attendant without departing from the spirit of my invention; and it is further obvious that in the use of a scraper constructed in accordance with this invention it is not essential that the scraper-bowl should be turned entirely over, as the inclination given the two sections may be sufficient to dump all the contained dirt; but it is desirable that the whole bowl should turn over, inasmuch as by so doing the rear section is caused to automatically assume its normal closed position by gravity without the necessity of any action on the part of the attendant, as will be readily understood by reference to Fig. 2.

Having thus described my invention, what I claim as new is—

1. In a scraper, the combination, with the bowl for transporting the dirt, of the rear bottom section hinged at the rear end thereto and adapted to be swung down to discharge the dirt, substantially as described.

2. In a scraper, the combination, with the divided scraper-bowl having the rear section hinged at the rear end thereto and adapted to be swung down for dumping the dirt, of the catches for holding said section elevated, substantially as described.

3. In a scraper, the combination, with the bowl for transporting the dirt, of the rear bottom section hinged thereto at the rear end and adapted to be swung down to discharge the dirt, substantially as described.

4. In a scraper, the combination, with a divided scraper-bowl having the rear section hinged thereto at the rear end for dumping the dirt and tilting the bowl, of the catches for holding the said section elevated, substantially as described.

5. In a wheel-scraper, the combination, with the cranked axle and the bowl pivotally connected thereto, of the rear section of the bowl hinged thereto for dumping the contained dirt, substantially as described.

6. In a wheel-scraper, the combination, with the axle and the reversible bowl connected thereto and adapted to be reversed to dump the load, of the rear section pivoted to the bowl at the rear end and adapted to swing down to cause said bowl to be tilted, substantially as described.

7. In a scraper, the combination, with the divided scraper-bowl having the rear section hinged thereto for dumping the dirt, of the catches for holding said section elevated, and the arms pivoted on one side in front of the catch and on the opposite side in rear of the catch and connected together for simultaneously releasing said catches, substantially as described.

CHARLES RATH.

Witnesses:
H. H. McGAHEY,
B. F. CLAMPITT.